United States Patent
Toner et al.

(10) Patent No.: US 9,512,793 B2
(45) Date of Patent: Dec. 6, 2016

(54) COMBUSTION DRIVEN AMMONIA GENERATION STRATEGIES FOR PASSIVE AMMONIA SCR SYSTEM

(71) Applicant: GM GLOBAL TECHNOLOGY OPERATIONS LLC, Detroit, MI (US)

(72) Inventors: Joel G. Toner, Bad Axe, MI (US); Kushal Narayanaswamy, Troy, MI (US); Gerald A. Szekely, Jr., Sterling Heights, MI (US); Paul M. Najt, Bloomfield Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 1030 days.

(21) Appl. No.: 13/652,549

(22) Filed: Oct. 16, 2012

(65) Prior Publication Data
US 2014/0102081 A1   Apr. 17, 2014

(51) Int. Cl.
F01N 3/20   (2006.01)
F02D 41/00   (2006.01)
F01N 3/10   (2006.01)
F02D 41/02   (2006.01)

(52) U.S. Cl.
CPC ............. *F02D 41/008* (2013.01); *F01N 3/101* (2013.01); *F01N 3/208* (2013.01); *F01N 3/2066* (2013.01); *F02D 41/0235* (2013.01); *F01N 2240/25* (2013.01); *F01N 2610/02* (2013.01); *Y02T 10/22* (2013.01); *Y02T 10/24* (2013.01)

(58) Field of Classification Search
CPC ...... F01N 3/101; F01N 3/20666; F01N 3/208; F01N 2610/02; F01N 2240/25; F02D 41/008; F02D 41/0235; Y02T 10/22; Y02T 10/24
USPC ......... 60/272–274, 282, 285, 286, 287, 295, 60/301
See application file for complete search history.

(56) References Cited

U.S. PATENT DOCUMENTS

| | | | | |
|---|---|---|---|---|
| 5,974,793 | A * | 11/1999 | Kinugasa | B01D 53/9454 60/278 |
| 7,558,667 | B2 * | 7/2009 | Kida | F02D 41/1495 123/198 F |
| 2002/0048542 | A1 * | 4/2002 | Deeba | B01D 53/9422 423/239.1 |
| 2007/0227518 | A1 * | 10/2007 | West | F01N 3/0842 123/673 |
| 2010/0107605 | A1 | 5/2010 | Brinkman et al. | |
| 2010/0212295 | A1 * | 8/2010 | Narayanaswamy | F02D 41/0235 60/285 |

(Continued)

OTHER PUBLICATIONS

U.S. Appl. No. 13/105,766.

*Primary Examiner* — Thomas Denion
*Assistant Examiner* — Mickey France

(57) ABSTRACT

A method for controlling ammonia generation in an exhaust gas feedstream output from an internal combustion engine equipped with an exhaust aftertreatment system including a first aftertreatment device includes executing an ammonia generation cycle to generate ammonia on the first aftertreatment device. A desired air-fuel ratio output from the engine and entering the exhaust aftertreatment system conducive for generating ammonia on the first aftertreatment device is determined. Operation of a selected combination of a plurality of cylinders of the engine is selectively altered to achieve the desired air-fuel ratio entering the exhaust aftertreatment system.

20 Claims, 6 Drawing Sheets

(56) References Cited

U.S. PATENT DOCUMENTS

| | | | | |
|---|---|---|---|---|
| 2010/0293930 A1* | 11/2010 | Li | .................... | B01D 53/8634 60/299 |
| 2011/0202253 A1 | 8/2011 | Perry et al. | | |
| 2011/0252766 A1 | 10/2011 | Ramanathan et al. | | |
| 2012/0128558 A1* | 5/2012 | Nunan | ................. | B01D 53/945 423/213.5 |

* cited by examiner

COMBUSTION DRIVEN AMMONIA GENERATION STRATEGIES FOR PASSIVE AMMONIA SCR SYSTEM

GOVERNMENT CONTRACT RIGHTS

This invention was made with U.S. Government support under Agreement No. DE-EE0003379 awarded by the U.S. Department of Energy. The U.S. Government may have certain rights in this invention.

TECHNICAL FIELD

This disclosure is related to aftertreatment of NOx emissions in internal combustion engines.

BACKGROUND

The statements in this section merely provide background information related to the present disclosure. Accordingly, such statements are not intended to constitute an admission of prior art.

Engine operating strategies to manage combustion to increase fuel efficiency include operating at a lean air-fuel ratio (AFR) using localized or stratified charge combustion within the combustion chamber while operating in an unthrottled condition. While temperatures in the combustion chamber can get high enough in pockets of combustion to create significant quantities of NOx, the overall energy output of the combustion chamber, in particular, the heat energy expelled from the engine through the exhaust gas flow can be substantially lower. Such conditions can be challenging to exhaust aftertreatment strategies, as the aftertreatment devices frequently require elevated operating temperatures driven by the exhaust gas flow temperature to operate adequately to treat NOx emissions.

Aftertreatment systems include catalytic devices to generate chemical reactions to treat exhaust gas constituents. Three-way catalytic devices (TWC) are utilized particularly in gasoline applications to treat exhaust gas constituents. Lean NOx adsorbers (NOx trap) utilize catalysts capable of storing some amount of NOx, and engine control technologies have been developed to combine these NOx adsorbers with fuel efficient engine control strategies to improve fuel efficiency and still achieve acceptable levels of NOx emissions. One known strategy includes using a lean NOx adsorber to store NOx emissions during lean operations and then purge and reduce the stored NOx during rich engine operating conditions with a TWC to nitrogen and water. Particulate filters (DPF) trap soot and particulate matter in diesel applications, and the trapped material is periodically purged during high temperature regeneration events.

One known aftertreatment device includes a selective catalytic reduction device (SCR). The SCR device includes catalytic material that promotes the reaction of NOx with a reductant, such as ammonia or urea, to produce nitrogen and water. The reductants may be injected into an exhaust gas feedstream upstream of the SCR device, requiring injection systems, tanks and control schemes. The tanks may require periodic refilling and can freeze in cold climates requiring additional heaters and insulation.

Catalytic materials used in SCR devices have included vanadium (V) and tungsten (W) on titanium (Ti) and base metals including iron (Fe) or copper (Cu) with a zeolite washcoat. Catalytic materials including copper may perform effectively at lower temperatures but have been shown to have poor thermal durability at higher temperatures. Catalytic materials including iron may perform well at higher temperatures but with decreasing reductant storage efficiency at lower temperatures.

For mobile applications, SCR devices generally have an operating temperature range of 150° C. to 600° C. The temperature range may vary depending on the catalyst. This operating temperature range can decrease during or after higher load operations. Temperatures greater than 600° C. may cause reductants to breakthrough and degrade the SCR catalysts, while the effectiveness of NOx processing decreases at temperatures lower than 150° C.

SUMMARY

A method for controlling ammonia generation in an exhaust gas feedstream output from an internal combustion engine equipped with an exhaust aftertreatment system including a first aftertreatment device includes executing an ammonia generation cycle to generate ammonia on the first aftertreatment device. A desired air-fuel ratio output from the engine and entering the exhaust aftertreatment system conducive for generating ammonia on the first aftertreatment device is determined. Operation of a selected combination of a plurality of cylinders of the engine is selectively altered to achieve the desired air-fuel ratio entering the exhaust aftertreatment system.

BRIEF DESCRIPTION OF THE DRAWINGS

One or more embodiments will now be described, by way of example, with reference to the accompanying drawings, in which.

DETAILED DESCRIPTION

Figure 1:
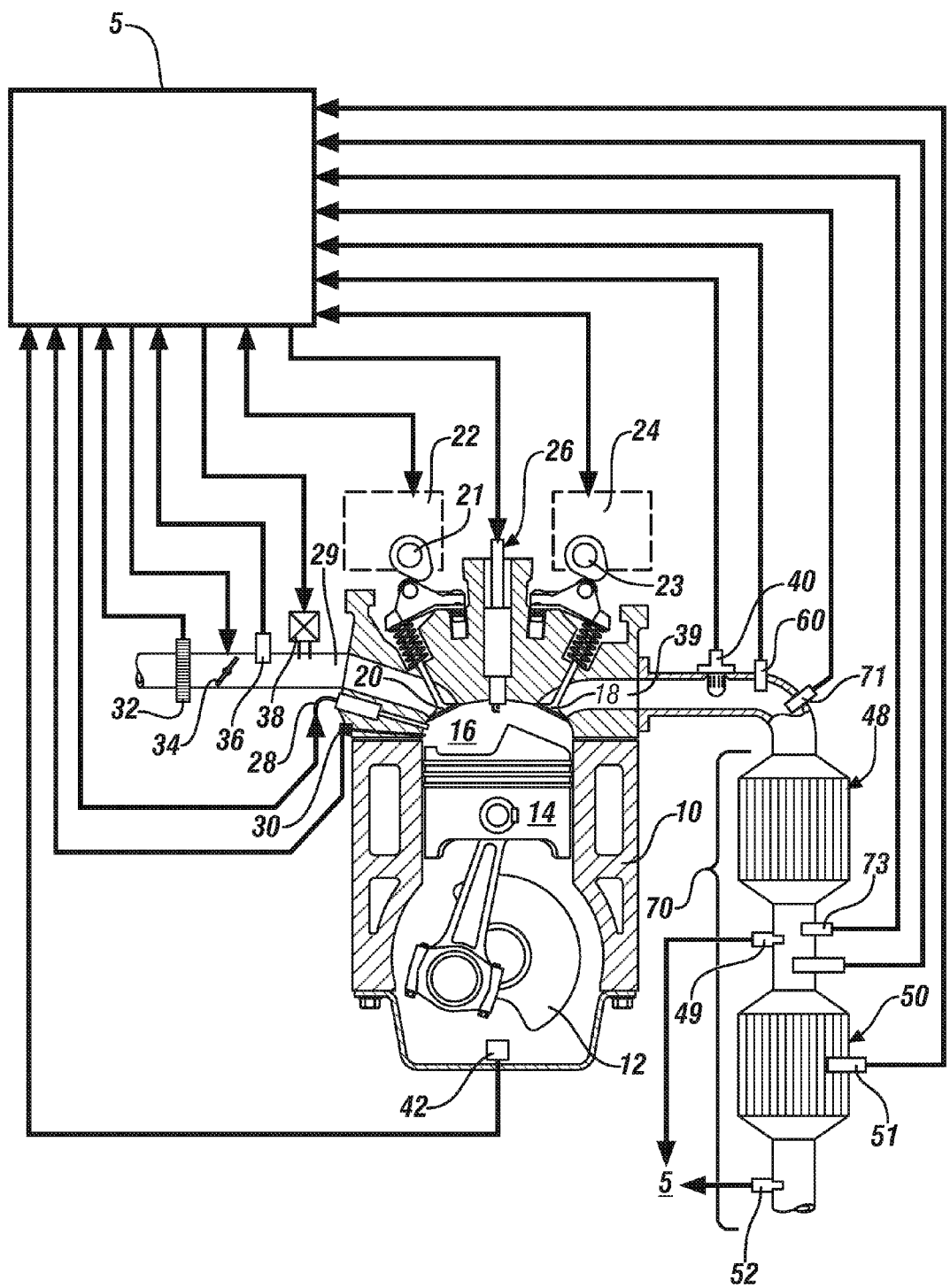
FIG. 1 illustrates an exemplary engine system and an exhaust aftertreatment system, in accordance with the present disclosure.

Referring now to the drawings, wherein the showings are for the purpose of illustrating certain exemplary embodiments only and not for the purpose of limiting the same, FIG. 1 schematically shows an internal combustion engine 10, aftertreatment system 70, and an accompanying control module 5 that have been constructed in accordance with an embodiment of the disclosure. The engine 10 is selectively operative at a rich air-fuel ratio (AFR), a stoichiometric AFR, and at an AFR that is primarily lean of stoichiometry. The disclosure can be applied to various internal combustion engine systems and combustion cycles.

In one embodiment the aftertreatment system 70 can be connected to the engine 10 that is coupled to an electromechanical hybrid powertrain system. The electro-mechanical hybrid powertrain system can include torque machines configured to transfer tractive power to a driveline of a vehicle.

The exemplary engine 10 is a multi-cylinder direct-injection four-stroke internal combustion engine having reciprocating pistons 14 slidably movable in cylinders which define variable volume combustion chambers 16. The pistons 14 are connected to a rotating crankshaft 12 by which linear reciprocating motion is translated to rotational motion. An air intake system provides intake air to an intake manifold 29 which directs and distributes air into intake runners of the combustion chambers 16. The air intake system includes airflow ductwork and devices for monitoring and controlling the airflow. The air intake devices preferably include a mass airflow sensor 32 for monitoring mass airflow and intake air temperature. A throttle valve 34 preferably includes an electronically controlled device that is used to control airflow to the engine 10 in response to a control signal (ETC) from the control module 5. A pressure sensor 36 in the intake manifold 29 is configured to monitor manifold absolute pressure and barometric pressure. An external flow passage recirculates exhaust gases from engine exhaust to the intake manifold 29, having a flow control valve referred to as an exhaust gas recirculation (EGR) valve 38. The control module 5 is operative to control mass flow of exhaust gas to the intake manifold 29 by controlling opening of the EGR valve 38.

Airflow from the intake manifold 29 into the combustion chamber 16 is controlled by one or more intake valve(s) 20. Exhaust flow out of the combustion chamber 16 is controlled by one or more exhaust valve(s) 18 to an exhaust manifold 39. The engine 10 is equipped with systems to control and adjust openings and closings of the intake and exhaust valves 20 and 18. In one embodiment, the openings and closings of the intake and exhaust valves 20 and 18 can be controlled and adjusted by controlling intake and exhaust variable cam phasing/variable lift control (VCP/VLC) devices 22 and 24 respectively. The intake and exhaust VCP/VLC devices 22 and 24 are configured to control and operate an intake camshaft 21 and an exhaust camshaft 23, respectively. The rotations of the intake and exhaust camshafts 21 and 23 are linked to and indexed to rotation of the crankshaft 12, thus linking openings and closings of the intake and exhaust valves 20 and 18 to positions of the crankshaft 12 and the pistons 14.

The intake VCP/VLC device 22 preferably includes a mechanism configured to switch and control valve lift of the intake valve(s) 20 and variably adjust and control phasing of the intake camshaft 21 for each cylinder in response to a control signal from the control module 5. The exhaust VCP/VLC device 24 preferably includes a controllable mechanism operative to variably switch and control valve lift of the exhaust valve(s) 18 and variably adjust and control phasing of the exhaust camshaft 23 for each cylinder in response to a control signal from the control module 5.

The intake and exhaust VCP/VLC devices 22 and 24 each preferably includes a controllable two-step variable lift control (VLC) mechanism configured to control magnitude of valve lift, or opening, of the intake and exhaust valve(s) 20 and 18, respectively, to one of two discrete steps. The two discrete steps preferably include a low-lift valve open position (about 4-6 mm in one embodiment) preferably for low speed, low load operation, and a high-lift valve open position (about 8-13 mm in one embodiment) preferably for high speed and high load operation. The intake and exhaust VCP/VLC devices 22 and 24 each preferably includes a variable cam phasing (VCP) mechanism to control and adjust phasing (i.e., relative timing) of opening and closing of the intake valve(s) 20 and the exhaust valve(s) 18 respectively. Adjusting the phasing refers to shifting opening times of the intake and exhaust valve(s) 20 and 18 relative to positions of the crankshaft 12 and the piston 14 in the respective cylinder. The VCP mechanisms of the intake and exhaust VCP/VLC devices 22 and 24 each preferably has a range of phasing authority of about 60°-90° of crank rotation, thus permitting the control module 5 to advance or retard opening and closing of one of intake and exhaust valve(s) 20 and 18 relative to position of the piston 14 for each cylinder. The range of phasing authority is defined and limited by the intake and exhaust VCP/VLC devices 22 and 24. The intake and exhaust VCP/VLC devices 22 and 24 include camshaft position sensors to determine rotational positions of the intake and the exhaust camshafts 21 and 23. The VCP/VLC devices 22 and 24 are actuated using one of electro-hydraulic, hydraulic, and electric control force, controlled by the control module 5.

The engine 10 includes a fuel injection system, including a plurality of high-pressure fuel injectors 28 each configured to directly inject a mass of fuel into one of the combustion chambers 16 in response to a signal from the control module 5. The fuel injectors 28 are supplied pressurized fuel from a fuel distribution system.

The engine 10 includes a spark-ignition system by which spark energy can be provided to a spark plug 26 for igniting or assisting in igniting cylinder charges in each of the combustion chambers 16 in response to a signal from the control module 5.

The engine 10 is equipped with various sensing devices for monitoring engine operation, including a crank sensor 42 having output RPM and operative to monitor crankshaft rotational position, i.e., crank angle and speed, in one embodiment a combustion sensor 30 configured to monitor combustion. The combustion sensor 30 includes a sensor device operative to monitor a state of a combustion parameter and is depicted as a cylinder pressure sensor operative to monitor in-cylinder combustion pressure. The output of the combustion sensor 30 and the crank sensor 42 are monitored by the control module 5 which determines combustion phasing, i.e., timing of combustion pressure relative to the crank angle of the crankshaft 12 for each cylinder for each combustion cycle. The combustion sensor 30 can also be monitored by the control module 5 to determine a mean-effective-pressure (IMEP) for each cylinder for each combustion cycle. Preferably, the engine 10 and control module 5 are mechanized to monitor and determine IMEP for each of the engine cylinders during each cylinder firing event. Alternatively, other sensing systems can be used to monitor other combustion parameters within the scope of the disclosure, e.g., ion-sense ignition systems, and non-intrusive cylinder pressure sensors.

The control module 5 executes routines to control actuators to control engine operation, including throttle position, spark timing, fuel injection mass and timing, intake and/or exhaust valve timing and phasing, and exhaust gas recirculation valve position to control flow of recirculated exhaust gases. Valve timing and phasing may include negative valve overlap and lift of exhaust valve reopening (in an exhaust re-breathing strategy). The control module 5 is configured to receive input signals from an operator (e.g., a throttle pedal position and a brake pedal position) to determine an operator torque request and input from the sensors indicating the engine speed and intake air temperature, and coolant temperature and other ambient conditions.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators. Routines may be executed at regular intervals, for example each 3.125, 6.25, 12.5, 25 and 100 milliseconds during ongoing engine and vehicle operation.

In operation, the control module 5 monitors inputs from the aforementioned sensors to determine engine operating parameters. The control module 5 is configured to receive input signals from an operator (e.g., via a throttle pedal and a brake pedal) to determine an operator torque request. The control module 5 monitors the sensors indicating the engine speed and intake air temperature, and coolant temperature and other ambient conditions.

The control module 5 executes routines stored therein to control the aforementioned actuators to form the cylinder charge, including controlling throttle position, spark-ignition timing, fuel injection mass and timing, EGR valve position to control flow of recirculated exhaust gases, and intake and/or exhaust valve timing and phasing on engines so equipped. Valve timing and phasing can include negative valve overlap (NVO) and lift of exhaust valve reopening (in an exhaust re-breathing strategy) in one embodiment. The control module 5 can operate to turn the engine 10 on and off during ongoing vehicle operation, and can operate to selectively deactivate a portion of the combustion chambers 16 or a portion of the intake and exhaust valves 20 and 18 through control of fuel and spark and valve deactivation.

The exhaust aftertreatment system 70 is fluidly connected to the exhaust manifold 39 and includes a catalytic device 48 and an ammonia-SCR device 50. The catalytic device 48 is fluidly and serially connected upstream of the ammonia-SCR device 50. Preferably the catalytic device 48 is located in an engine compartment and is close-coupled to the exhaust manifold 39. Preferably the ammonia-SCR device 50 is located in an underfloor location at an extended distance from the catalytic device 48 determined based upon engine and exhaust gas feedstream operating temperatures and other factors. The exhaust aftertreatment system 70 may include other catalytic and/or trap substrates operative to oxidize, adsorb, desorb, reduce, and combust elements of the exhaust gas feedstream as described herein below.

The exhaust aftertreatment system 70 can be equipped with various sensing devices for monitoring the exhaust gas feedstream from the engine 10, including a first NOx sensor 49, a second NOx sensor 52, and an SCR temperature sensor 51 signally connected to the control module 5. The first and second NOx sensors 49 and 52 detect and quantify NOx molecules in the exhaust gas feedstream. The first NOx sensor 49 detects and quantifies NOx molecules in the exhaust gas feedstream exiting the catalytic device 48 and entering the ammonia-SCR device 50. An additional third NOx sensor 60 may be included upstream of the exhaust aftertreatment system 70 to detect and quantify NOx molecules in the exhaust gas feedstream entering the aftertreatment system 70. In one embodiment only the second NOx sensor 52 is included on the aftertreatment system 70.

In an exemplary embodiment of the present disclosure, the exhaust aftertreatment system 70 is equipped with first and second exhaust gas feedstream sensors 71, 73, respectively. The first exhaust gas feedstream sensor 71 can be configured to monitor an AFR in the exhaust gas feedstream at a first location in the exhaust aftertreatment system 70 that includes an AFR in the exhaust gas feedstream upstream of the catalytic device 48. The second exhaust gas feedstream sensor 73 can be configured to monitor an AFR in the exhaust gas feedstream at a second location in the exhaust aftertreatment system 70 that includes an AFR in the exhaust gas feedstream downstream of the catalytic device 48. The first and second exhaust gas feedstream sensors 71, 73, respectively, can each include a wide-range AFR sensor configured to generate a linear signal corresponding to AFR over an AFR range. Alternatively, in one embodiment, the first and second exhaust gas feedstream sensors 71, 73, respectively, can include a switch-type stoichiometric sensor configured to generate an output signal that corresponds to an AFR that is one of rich of stoichiometry and lean of stoichiometry. As will become apparent, the control module can control AFR based upon feedback from the first and second exhaust gas feedstream sensors 71, 73, respectively.

During engine operation, the exemplary engine 10 generates an exhaust gas feedstream containing constituent elements that can be transformed in the aftertreatment system, including unburned hydrocarbons (HC), carbon monoxide (CO), oxides of nitrogen (NOx), and particulate matter (PM), among others. Oxygen ($O_2$) is present in the exhaust gas feedstream after operating the engine 10 lean of stoichiometry. Hydrogen ($H_2$) production can occur in the engine 10 through the combustion process. Combustion in a stoichiometric or rich AFR environment, wherein molecular oxygen is scarce due to oxygen being depleted, tends to produce elevated levels of molecular hydrogen.

The catalytic device 48, e.g., first aftertreatment device, performs a number of catalytic functions for treating an exhaust gas flow. The catalytic device 48 oxidizes hydrocarbons (HC) and carbon monoxide (CO). The catalytic device 48 is formulated to produce ammonia during stoichiometric and rich engine operation. The formulation may involve using varying catalysts including platinum group metals, e.g., platinum, palladium, and rhodium, with cerium and zirconium oxides for oxygen storage capacity. In one embodiment, the catalytic device 48 is a three-way catalytic converter configured to oxidize hydrocarbons (HC) and carbon monoxide (CO) and reduce NOx during stoichiometric engine operations.

The ammonia-SCR device 50 reduces NOx into other molecules, including nitrogen and water as described hereinbelow. An exemplary ammonia-SCR device 50 includes a substrate coated with a zeolite washcoat and catalytic material including a catalytically active base metal. The substrate includes a cordierite or metal monolith with a cell density about 62 to 93 cells per square centimeter (400-600 cells per square inch), and a wall thickness about three to seven mils. The cells of the substrate include flow passages through which exhaust gas flows to contact the catalyst to effect storage of ammonia. The substrate is impregnated with the zeolite washcoat. The zeolite washcoat also contains the catalytically active base metals, e.g., iron (Fe), copper (Cu), cobalt (Co), nickel (Ni). Alternatively, vanadium-based and/or tungsten (W) on titanium (Ti) compositions may be used as catalysts. Copper catalysts have been shown to perform effectively at lower temperatures, e.g., 100° C. to 450° C., but have poor thermal durability. Iron catalysts may perform well at higher temperatures, e.g., 200° C. to 650° C., but with decreasing reductant storage capacity.

The ammonia-SCR device 50 stores ammonia to reduce NOx emissions. The stored ammonia-selectively reacts with NOx in the presence of the catalytic materials to produce nitrogen and water. The following relationships represent the primary reactions with ammonia within the ammonia-SCR device 50.

$$4NO+4NH_3+O_2 \rightarrow 4N_2+6H_2O \qquad [1]$$

$$3NO_2+4NH_3 \rightarrow 3.5N_2+6H_2O \qquad [2]$$

$$2NO+2NO_2+4NH_3 \rightarrow 4N_2+6H_2O \qquad [3]$$

Multiple secondary reactions may concurrently occur and will vary depending on the type of fuel consumed.

It will be appreciated that engine operation can be controlled selectively and periodically to generate an exhaust gas feedstream including unburned hydrocarbons (HC), nitric oxide (NO), carbon monoxide (CO), and hydrogen ($H_2$) to produce ammonia in or on a catalytic device, such as the catalytic device 48.

Ammonia may be produced in the catalytic device 48 from a conversion process represented by the following relationship.

$$NO+CO+1.5H_2 \rightarrow NH_3+CO_2 \qquad [4]$$

One having ordinary skill in the art will appreciate that this conversion requires molecular oxygen to be depleted from the catalytic device 48 before NO will react with the molecular hydrogen. In one embodiment, sufficient conversion occurred at temperatures exceeding 250° C. in the catalytic device 48. Excess oxygen is frequently present when the internal combustion engine is operated in lean operating modes, with a lean AFR or with excess air. Thus, the control module 5 controls the AFR to a stoichiometric AFR or rich AFR to deplete oxygen in the exhaust gas feedstream when ammonia production in the catalytic device 48 is desired.

Further, selection of an AFR within the stoichiometric and rich operating ranges further facilitates ammonia production, for example, by producing nitric oxide (NO) and hydrogen ($H_2$) in appropriate ratios. Eq. 4 shows an ideal ratio of 1.5:1 of hydrogen to nitric oxide ($H_2$:NO). However, based upon the environment provided by the ammonia-SCR device 50 and other reactions taking place within the catalytic device 48, a different actual ratio of hydrogen ($H_2$) to nitric oxide (NO) can produce ammonia. For example, a ratio of between 3:1 and 5:1 hydrogen to nitric oxide ($H_2$:NO) is preferred in one embodiment.

Controlling engine operation includes operating the engine 10 rich or at stoichiometry while meeting the operator torque request and without changing engine output power. Operating the exemplary engine 10 rich of stoichiometry can include executing multiple fuel injection pulses during a combustion cycle including injecting a first fuel pulse into the combustion chamber 16 during each compression stroke. The mass of fuel injected during the first fuel pulse is determined based upon an amount sufficient to operate the engine 10 to meet the operator torque request and other load demands. Subsequent fuel pulses can be injected into the combustion chamber 16 during other strokes of the combustion cycle thereby generating an exhaust gas feedstream including nitric oxide (NO), carbon monoxide (CO), hydrogen ($H_2$) and unburned hydrocarbons (HC) to produce ammonia in the catalytic device 48. In one embodiment, the subsequent fuel pulses are executed late in a power stroke or early in an exhaust stroke of the combustion cycle thereby minimizing likelihood of combustion in the combustion chamber 16.

It will be appreciated that operating all cylinders of the engine at a fixed AFR that is rich of stoichiometry or stoichiometric can result in increased CO formation on the catalytic device 48. Intermittently operating some cylinders lean of stoichiometry can provide increased levels of $O_2$ to oxidize the CO formed from rich of stoichiometry and stoichiometric AFRs.

Selection of a catalytically active material that enables lower ratios of hydrogen ($H_2$) molecules to nitric oxide (NO) molecules on the catalytic device 48 is preferable, as hydrogen requirements directly relate to an amount of fuel that is consumed by the subsequent fuel pulses to enable ammonia production. Calibration according to test results or modeling sufficient to accurately estimate engine operation, aftertreatment processes, and conversions can be utilized to select a desired AFR to control ammonia production. One having ordinary skill in the art will appreciate that carbon monoxide (CO) presence must also be considered to facilitate the reaction described above.

Ammonia production can be controlled or enabled according to a number of factors affecting ammonia usage within the ammonia-SCR device 50, including estimated ammonia storage, estimated or detected ammonia breakthrough, estimated or detected NOx breakthrough downstream from the ammonia-SCR device 50, and engine operation conducive to ammonia production. Monitoring of these factors can be accomplished through monitoring a number of inputs, including engine operation, exhaust gas properties, and NOx conversion efficiency within the ammonia-SCR device 50. For example, the engine 10 produces higher levels of NOx and hydrogen during engine acceleration. Such periods conducive to ammonia production can be utilized to minimize intrusive operation of ammonia production under engine operating conditions less conducive thereto. Periods of engine operation to produce ammonia will vary depending upon required ammonia production, the particulars of the system employed, and the particular operation of the engine 10.

Figure 2:
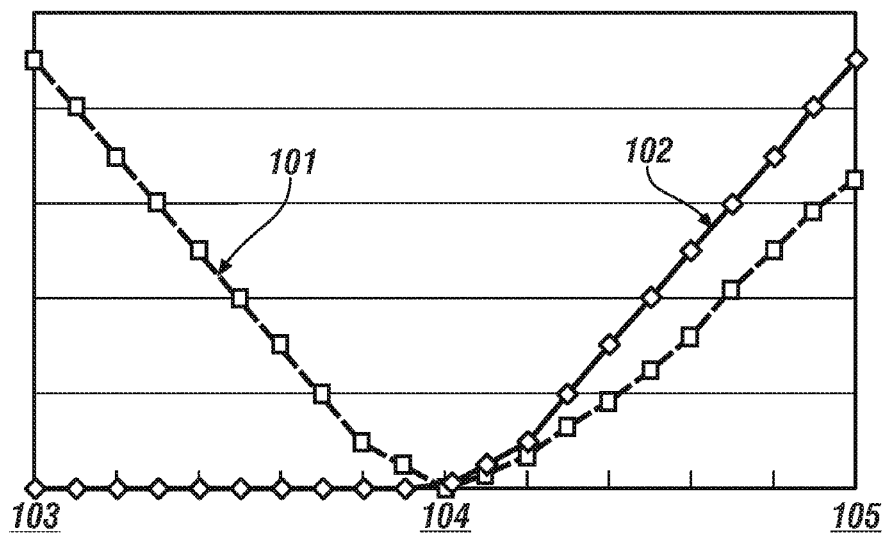
FIG. 2 illustrates exemplary test data from a NOx sensor and an ammonia sensor as a function of air-fuel ratio, in accordance with the present disclosure.

FIG. 2 graphically illustrates exemplary test data showing signal outputs from a known NOx sensor and a known ammonia sensor as a function of AFR (horizontal axis) from the engine 10, illustrative of signal outputs (vertical axis) from the first and second NOx sensors 49 and 52 and an ammonia sensor. Known NOx sensing technologies do not distinguish between NOx molecules and ammonia molecules in the exhaust gas feedstream. During lean engine operating conditions (i.e. between 104 and 103 along the horizontal axis), when ammonia presence in the exhaust gas feedstream is minimal and NOx molecules are present, signal output from the NOx sensor (101) indicates NOx molecules and increases with increasing AFR (i.e. moving left between 104 and 103 along the horizontal axis). Signal output from the ammonia sensor (102) is minimal. At stoichiometric engine operating conditions (104), when NOx molecules and ammonia molecules present in the exhaust gas feedstream are minimal, signal output from the NOx sensor and the ammonia sensor are minimal. As the AFR decreases during rich engine operating conditions (i.e. moving right between 104 and 105 along the horizontal axis), the presence of ammonia molecules increase while NOx molecules are minimal in the exhaust gas feedstream. Signal outputs from the NOx sensor and the ammonia sensor increase during rich engine operation as the AFR decreases. Therefore, during rich engine operation increased signal output from the first and second NOx sensors 49 and 52 can be used to indicate ammonia molecules in the exhaust gas feedstream. Thus, ammonia breakthrough may be detected by monitoring signal output of the second NOx sensor 52 during rich engine operation. In one embodiment, the second NOx sensor 52 is monitored for increased signal output during ammonia production. When signal output from the second NOx sensor 52 increases, the control scheme 200 determines that ammonia breakthrough is occurring.

Figure 3:
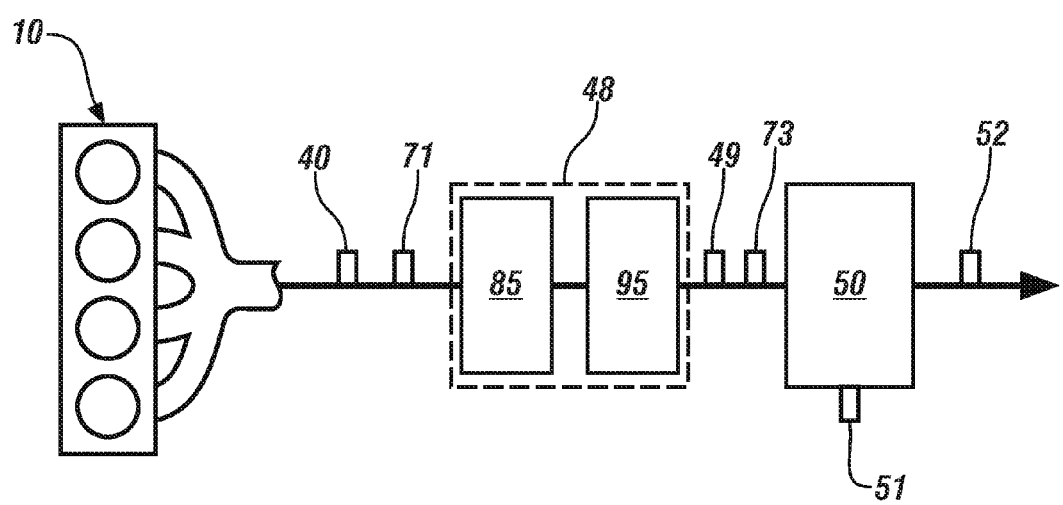
FIG. 3 illustrates an exemplary embodiment of the exhaust aftertreatment system of FIG. 1, in accordance with the present disclosure.

FIG. 3 schematically illustrates an exemplary embodiment of the exhaust aftertreatment system 70 in accordance with the present disclosure. The catalytic device 48, i.e., first aftertreatment device, includes two discrete elements 85 and 95 positioned in series along a flow axis of the exhaust gas feedstream. The flow axis of the exhaust gas feedstream represents the direction of engine-out exhaust gases flowing from the engine 10 through each of the catalytic device 48 and the ammonia-SCR device 50. The first discrete element 85 can be referred to as a front element or front brick and the second discrete element 95 can be referred to as a rear element or rear brick. The first discrete element 85 includes catalytic material including palladium. The second discrete element 95 includes catalytic material including palladium and rhodium. The second discrete element 95 further includes oxygen storage capacity material including one of or both cerium and zirconium oxides. In the exemplary embodiment, the catalytic device 48 is a three-way catalytic (TWC) device fluidly serially connected upstream of the ammonia-SCR device 50, i.e., second aftertreatment device. The following relationships represent the primary reactions with the engine-out exhaust gas feedstream including nitric oxide, carbon monoxide, hydrogen and unburned hydrocarbons within the TWC device 48.

$$2H_2 + O_2 \rightarrow 2H_2O \quad [5]$$

$$4HC + 5O_2 \rightarrow 2H_2O + 4CO_2 \quad [6]$$

$$2HC + 2H_2O \rightarrow 2CO + 3H_2 \quad [7]$$

$$CO + \tfrac{1}{2}O_2 \rightarrow CO_2 \quad [8]$$

$$2NO + 4H_2 + CO \rightarrow 2NH_3 + CO_2 + H_2O \quad [9]$$

$$4CeO_2 \rightarrow O_2 + 2Ce_2O_3 \quad [10]$$

$$CO + H_2O \rightarrow CO_2 + H_2 \quad [11]$$

It will be appreciated that HC oxidation is facilitated by Equation [6]. Equation [9] facilitates ammonia formation on the first discrete element 85. An oxygen storage capacity reaction is facilitated by Equation [10] on the second discrete element 95, and therefore can be utilized to determine oxygen storage capacity on the second discrete element 95. It will be appreciated that the presence of the oxygen storage capacity on the second discrete element 95 may promote a water-gas shift reaction facilitated by Equation [11] when the engine-out exhaust gas feedstream includes an AFR rich of stoichiometry. The water-gas shift reaction produces hydrogen ($H_2$) as a by-product on the second discrete element 95 which flows within the exhaust gas feedstream downstream of the catalytic device 48.

Figure 4:
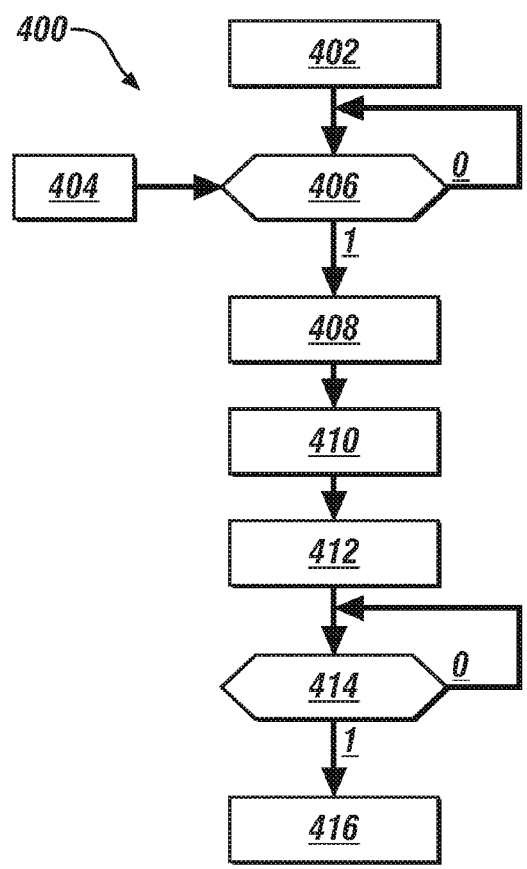
FIG. 4 illustrates controlling ammonia generation in an exhaust gas feedstream output from an internal combustion engine equipped with an exhaust aftertreatment system, in accordance with the present disclosure.

Further, Equation [11] demonstrates when cylinders operate at AFRs rich of stoichiometry, carbon monoxide can form on the TWC device 48 that can potentially result in carbon monoxide breakthrough. However, when cylinders operate at AFRs lean of stoichiometry, oxygen output from the engine within the exhaust gas feedstream oxidizes with the carbon monoxide on the TWC device as demonstrated by Equation [4]. As will become apparent, operation of any selected combination of cylinders may be selectively altered to intermittently expose the TWC device 48 to both AFRs rich and lean of stoichiometry to reduce carbon monoxide breakthrough while producing ammonia on the TWC device 48. In an exemplary embodiment, selectively altering operation of any selected combination of cylinders includes operating all cylinders of the engine to dither around the desired AFR. In another exemplary embodiment, selectively altering operation of any selected combination of cylinders includes operating each of a selected combination of a plurality of cylinders of the engine at a biased AFR (e.g., rich of stoichiometry AFR) and each of the remaining cylinders at an un-biased AFR (e.g., lean of stoichiometry AFR) resulting in operation at an average AFR of the selected combination of the plurality of cylinders and the remaining cylinders that is equal to the desired AFR. Combining dithering to at least one of a biased AFR and an un-biased AFR is also envisioned FIG. 4 is a flowchart 400 for controlling ammonia generation in an exhaust gas feedstream output from the internal combustion engine 10 equipped with the exhaust aftertreatment system of FIGS. 1 and 3 in accordance with the present disclosure. The flowchart may be executed as one or more routines in the control module 5. Table 1 is provided as a key to FIG. 4 wherein the numerically labeled blocks and the corresponding functions are set forth as follows.

TABLE 1

| BLOCK | BLOCK CONTENTS |
|---|---|
| 402 | Determine if an ammonia generation cycle is necessary based on monitoring engine operation, the exhaust gas feedstream and the exhaust aftertreatment system. |
| 406 | Is an ammonia generation condition met? |
| 404 | Obtain measurements from the first NOx sensor 49, the second NOx sensor 52, the first exhaust gas feedstream sensor 71 and the second exhaust gas feedstream sensor 73. |
| 408 | Execute an ammonia generation cycle to generate ammonia on the first aftertreatment device 48. |
| 410 | Determine a desired AFR of the engine to generate an engine-out exhaust gas feedstream conducive for generating ammonia on the first aftertreatment device. |
| 412 | Selectively alter operation of any selected combination of a plurality of cylinders of the engine such that the desired AFR of the engine is achieved. |
| 414 | Is a condition to terminate ammonia generation met? |
| 416 | Discontinue the ammonia generation cycle to generate ammonia on the catalytic device 48. |

Referring to block 402, the flow chart commences to determine if an ammonia generation cycle is necessary based on monitoring engine operation, the exhaust gas feedstream and the exhaust aftertreatment system 70. The flowchart 400 then proceeds to decision block 406.

Decision block 406 determines if an ammonia generation condition is met. In an exemplary embodiment, the ammonia generation condition is met when storage on the ammonia-SCR device 50 is low and opportunistic driving conditions are present. For instance, the storage on the ammonia-SCR device 50 is low when the ammonia-SCR device has not stored a predetermined amount of ammonia. In another exemplary embodiment, the ammonia generation condition is met only when storage on the ammonia-SCR device 50 is low. From block 404, ammonia depletion on the ammonia-SCR device 50 can be determined based on obtained measurements from at least one of the first and second NOx sensors 49, 52, respectively. In an exemplary embodiment, only the second NOx sensor 52 is utilized to determine if ammonia storage on the ammonia-SCR device 50 is low indicating ammonia depletion. It is understood that ammonia generation is not desirable when ammonia depletion is not present or the ammonia-SCR device 50 is otherwise saturated with ammonia. Saturation of the ammonia-SCR device 50 can be determined by detecting NOx breakthrough and ammonia breakthrough downstream of the ammonia-SCR device 50 using the second NOx sensor 52. Block 404 further obtains measurements from the first and second exhaust gas feedstream sensors 71,73, respectively, for utilization in decision block 410 below.

Further, decision block 406 determines whether opportunistic driving conditions conducive to ammonia generation are present to minimize intrusive operation of ammonia generation under operating conditions less conducive thereto. Opportunistic driving conditions can include periods of engine acceleration, or driving conditions requiring engine operation with a stoichiometric AFR or an AFR rich of stoichiometry. It will be appreciated that an engine operates at increased torque and increased speed during periods of acceleration, wherein the engine frequently requires a transmission from a lean operating mode to a stoichiometric or rich operating mode. A "0" denotes the ammonia generation condition is not met, e.g., at least one of ammonia storage on the ammonia-SCR device 50 is not low and opportunistic driving conditions are not present. Accordingly, the flowchart 400 reverts back to block 402. A "1" indicates that the ammonia generation condition is met, e.g., at least one of storage on the ammonia-SCR device 50 is low and opportunistic driving conditions are present. The flowchart 400 proceeds to block 408.

Referring to block 408, an ammonia generation cycle is executed to generate ammonia on the first aftertreatment device 48, e.g., the catalytic device 48 being a TWC device. Executing the ammonia generation cycle to generate ammonia on the first aftertreatment device is described in further detail with reference to blocks 410 and 412.

Referring to block 410, a desired AFR of the engine to generate an engine-out exhaust gas feedstream conducive for generating ammonia on the first aftertreatment device 48 is determined. The desired AFR of the engine includes one a stoichiometric AFR and a rich of stoichiometric AFR for maximizing ammonia generation on the first aftertreatment device 48. The engine-out exhaust gas feedstream generated by the desired AFR includes nitric oxide (NO), carbon monoxide (CO), hydrogen ($H_2$) and unburned hydrocarbons (HC) that converts to ammonia on the first aftertreatment device 48 utilizing one of Equations [4] and [9]. Operating the engine at one of a stoichiometric AFR and a rich of stoichiometric AFR creates rich zones in the exhaust gas feedstream necessary to deplete the oxygen from the aftertreatment system and subsequently produce ammonia. In an exemplary embodiment, stoichiometric operation of the engine includes an AFR of about 14.6. In an exemplary embodiment, rich operation of the engine includes an AFR ranging from 14.5 to 14.0. In a non-limiting example, the desired AFR can include air-fuel ratios ranging from 14.6 to 14.1 for generating a desired quantity of ammonia on the first aftertreatment device 48.

However, when each of a plurality of cylinders of the engine fixedly operate at one of the stoichiometric AFR and the rich of stoichiometry AFR, carbon monoxide breakthrough can occur on the first aftertreatment device 48, i.e., TWC device, as evidenced by Equation [11]. In order to minimize carbon monoxide breakthrough, one or more of the cylinders of the engine require operation at a lean of stoichiometry AFR or periodic operation at the lean of stoichiometry AFR, to facilitate oxidation of the carbon monoxide formed on the first aftertreatment device 48, as demonstrated by Equation [4].

Referring to block 412, operation of any selected combination of a plurality of cylinders of the engine is selectively altered such that the desired AFR of the engine is achieved. In other words, the plurality of cylinders that includes the selected combination of the plurality of cylinders operate at an average AFR that is equal to the desired AFR.

In an exemplary embodiment, each of a selected combination of the plurality of cylinders may be operated to dither around a median AFR resulting in an average AFR of the engine that is equal to the desired AFR. When the selected combination of the plurality of cylinders includes all cylinders of the engine, the median AFR is equal to the desired AFR. For instance, if the desired AFR is equal to 14.6, all cylinders of the engine will be operated to dither around the AFR of 14.6.

Dithering includes alternating operation of each of the selected combination of the plurality of cylinders between an AFR having a peak amplitude above the median AFR and an AFR having a trough amplitude below the median AFR. A magnitude of the peak amplitude above the median AFR is equal to a magnitude of the trough amplitude below the median AFR. In a non-limiting example when the median AFR is equal to 14.6, the peak amplitude can be equal to an AFR of 14.2 and the trough amplitude can be equal to an AFR of 15.0. The dithering is performed at a fixed frequency. One skilled in the art will appreciate that the operation of the cylinders alternating between the rich AFR, e.g., 14.2, and the lean AFR, e.g., 15.0, ensures an average AFR of 14.6 that is equal to the desired AFR conducive for ammonia generation on the catalytic device 48, wherein the lean AFR generates excess oxygen for facilitating oxidation of carbon monoxide formed on the catalytic device 48 to minimize carbon monoxide breakthrough, as demonstrated by Equation [4]. One skilled in the art will appreciate that operation at AFRs too lean must be avoided to still ensure that oxygen is depleted on the catalytic device 48 so NO may still react with the molecular hydrogen.

In another exemplary embodiment, selectively altering operation of any selected combination of the plurality of cylinders of the engine such that the desired AFR of the engine is achieved includes operating each of a selected combination of the plurality of cylinders at a biased AFR and operating each of the remaining cylinders at an un-biased AFR resulting in operation at an average AFR of the selected combination of the plurality of cylinders and the remaining cylinders that is equal to the desired AFR. In an exemplary embodiment, the biased AFR can include a rich of stoichiometry AFR and the un-biased AFR can include one of a stoichiometric AFR and a lean of stoichiometry AFR. In an exemplary embodiment, the selected combination of the plurality of cylinders includes a majority of the plurality of cylinders. For instance, in a four cylinder engine, three cylinders may be selected to operate at the biased AFR including a rich AFR and the remaining cylinder may operate at the un-biased AFR including a stoichiometric AFR.

In another exemplary embodiment, each of the selected combination of the plurality of cylinders operated at the biased AFR can be configured to dither around the biased AFR ratio. Conversely, each of the remaining cylinders operated at the un-biased AFR can be configured to dither around the un-biased AFR. As will become apparent, selectively altering operation of any selected combination of the plurality of cylinders to dither around a median AFR, operate at a biased AFR or a combination thereof can be based on many factors including, but not limited to, opportunistic driving conditions, desired amount of ammonia generation on the first aftertreatment device 48, desired CO conversion efficiency and fuel economy.

Referring to decision block 414, it is determined whether a condition to terminate ammonia generation is met. In an exemplary embodiment, the condition to terminate ammonia generation is met when at least one of the ammonia-SCR device 50 is saturated with ammonia and when opportunistic driving conditions have ended. In another exemplary embodiment, the condition to terminate ammonia generation is met only when it is determined that the ammonia-SCR device 50 has become saturated with ammonia. In other words, the ammonia-SCR device 50 has become saturated with ammonia when the ammonia-SCR device 50 has stored a predetermined amount of ammonia. When the ammonia-SCR device 50 has become saturated, further generation of ammonia on the catalytic device 48 is no longer desirable. In an exemplary embodiment, ammonia saturation may be estimated based upon a predetermined elapsed time, or by monitoring the exhaust gas feedstream downstream of the ammonia-SCR device 50 to detect ammonia breakthrough, or determined after executing a predetermined number of cylinder events. For instance, ammonia breakthrough may be detected by monitoring a signal output of an ammonia sensor configured to monitor the exhaust gas feedstream of the ammonia-SCR device 50. In another exemplary embodiment, ammonia breakthrough includes monitoring the second NOx sensor 52. For instance, during rich engine operation, an increasing signal output from the second NOx sensor 52 indicates ammonia breakthrough. In another exemplary embodiment, saturation may be estimated using a model sufficient to accurately estimate operation of the combustion cycle, aftertreatment processes, conversions and monitored operation conditions including intake mass airflow, AFR, engine speed, TWC temperature, TWC aging state, ammonia-SCR device temperature and ammonia-SCR device aging state. The model may be calibrated according to test results corresponding to a particular hardware application. In yet another exemplary embodiment, saturation of the ammonia-SCR device 50 can be determined when a predetermined amount of ammonia has been stored on the ammonia-SCR device 50.

Further, if decision block 414 determines opportunistic driving conditions have ended, generating ammonia on the catalytic device 48 may no longer be desirable due to the likelihood of intrusive operation of ammonia generation under operating conditions less conducive thereto. In an exemplary embodiment, opportunistic driving conditions are deemed to have ended when operating conditions are not conducive to ammonia production, e.g., during vehicle decelerations, engine idling, or engine stops. A "0" indicates the condition to terminate ammonia generation has not been met, e.g., at least one of the ammonia-SCR device 50 is not saturated and the opportunistic driving conditions are still present. Accordingly, the flowchart reverts back to block 412. A "1" indicates the condition to terminate ammonia generation is met, e.g., a determination that at least one of the ammonia-SCR devices 50 has become saturated and the opportunistic driving conditions have ended. Accordingly, the flowchart proceeds to block 416.

Referring to block 416, the ammonia generation cycle to generate ammonia on the first aftertreatment device is discontinued or terminated. For instance, the ammonia-SCR device 50 is saturated or opportunistic driving conditions have ended. The flowchart 400 discontinues ammonia generation and transitions engine operation to a normal engine operation. In other words, engine operation is transitioned to operate at a non-ammonia generating condition. For instance, engine operation during the non-ammonia generating condition may include stoichiometric engine operation without ammonia generation. In another instance, engine operation during the non-ammonia generating condition may include lean engine operation. In an exemplary embodiment, lean engine operation includes an AFR of 16.0. In another exemplary embodiment, lean engine operation includes an AFR exceeding 20.0. The catalytic device 48 reduces a portion of the NOx emissions transferring oxygen and nitrogen downstream to the ammonia-SCR device 50. Ammonia stored on the catalyst of the ammonia-SCR device 50 reacts with NOx entering the ammonia-SCR device 50 thereby reducing NOx emissions and producing nitrogen and water. The stored ammonia is depleted as ammonia molecules react with NOx molecules. When the ammonia on the catalyst of the ammonia-SCR device 50 is depleted, NOx emissions pass through the ammonia-SCR device 50 unprocessed. Therefore, a subsequent ammonia generation cycle may be initiated to generate ammonia on the catalyst device.

Figure 5:
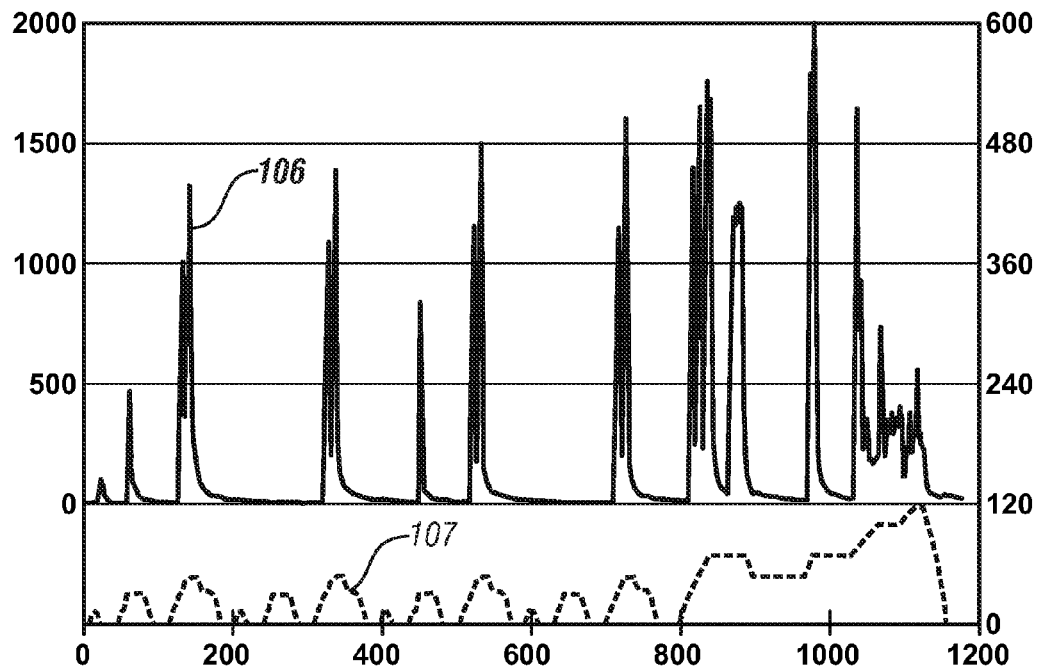
FIG. 5 illustrates exemplary test data representing a relationship between ammonia production and vehicle speed, in accordance with the present disclosure.

FIG. 5 graphically depicts exemplary test data representing a relationship between ammonia production and vehicle speeds. The horizontal axis denotes a test time in seconds from 0 to 1,200 seconds in increments of 200 seconds. The left vertical axis denotes ammonia concentration in ppm from 0 to 2,000 ppm in increments of 500 ppm. The right vertical axis denotes vehicle speed in km/h from 0 to 600 km/hr in increments of 120 km/hr. Profile line 106 represents ammonia concentration through the depicted test time and Profile line 107 represents vehicle speed through the depicted test time. Ammonia concentrations were measured with a Fourier-transform infrared spectrometer during engine operations using the exemplary aftertreatment system 70. As FIG. 5 shows, during engine accelerations, when the exemplary engine 10 operates at stoichiometry or slightly rich of stoichiometry (e.g., AFR between 13.8:1 and 14.2:1), ammonia concentrations produced by the catalytic device 48 can increase.

Figure 6:
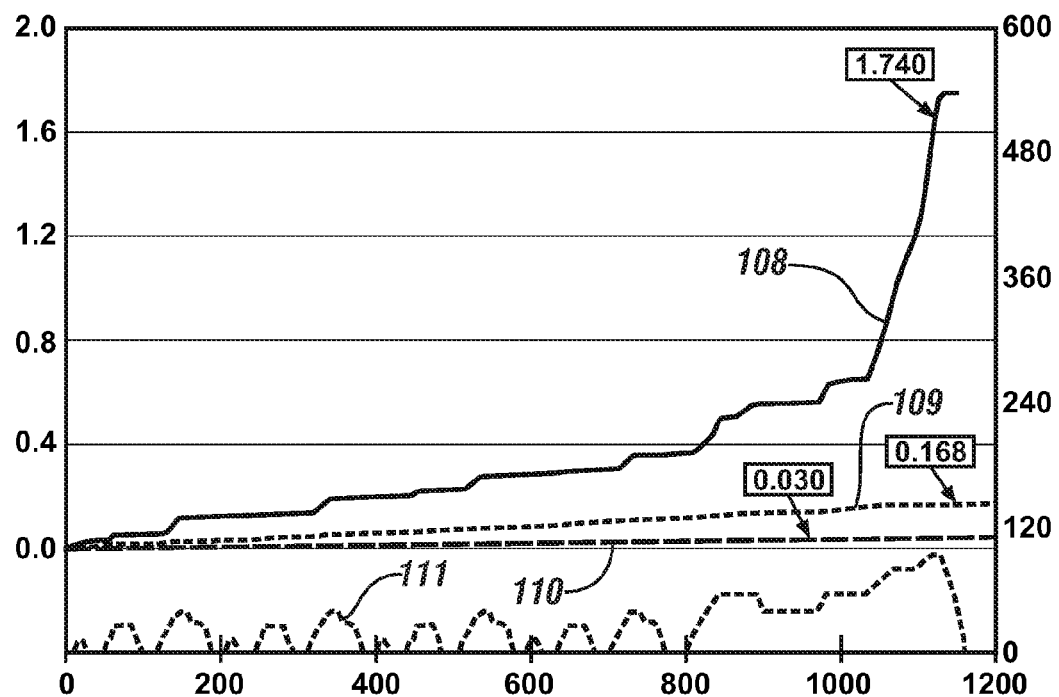
FIG. 6 illustrates exemplary test data representing a relationship between cumulative NOx emissions and vehicle speed, in accordance with the present disclosure.

FIG. 6 graphically depicts exemplary test data depicting a relationship between cumulative NOx emissions out of the exemplary engine 10, catalytic device 48, and the ammonia-SCR device 50 and vehicle speed. The horizontal axis denotes a test time in seconds from 0 to 1,200 seconds in increments of 200 seconds. The left vertical axis denotes cumulative NOx emissions in g/km from 0 to 2.0 g/km in increments of 0.4 g/km. The right vertical axis denotes vehicle speed in km/h from 0 to 600 km/h in increments of 120 km/h. Profile line 108 represents a cumulative engine out NOx. Profile line 109 represents a cumulative NOx measured after the catalytic device 48. Profile line 110 represents a cumulative NOx measured after the ammonia- SCR device 50. Plot 111 represents vehicle speed in km/hr. When the exemplary engine 10 is controlled to alternate between lean and rich excursions, significantly less NOx emissions pass out of the aftertreatment system 70 than emitted by the exemplary engine 10 into the exhaust gas feedstream. FIG. 6 also depicts a NOx reduction by the ammonia-SCR device 50 after NOx reduction in the catalytic device 48.

Figure 7:
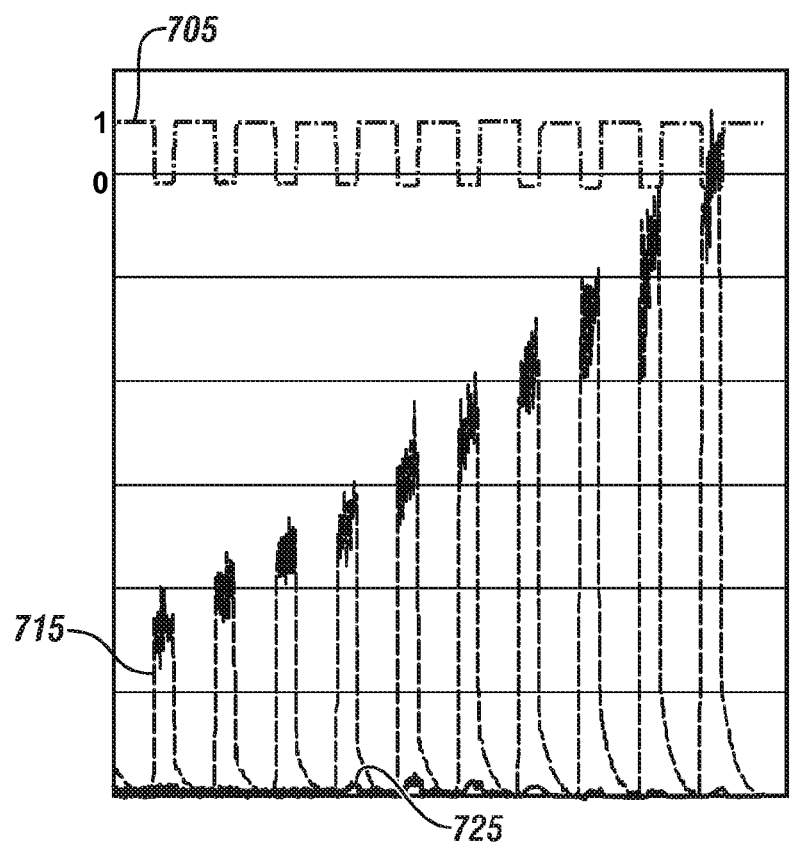
FIGS. 7 and 8 illustrate exemplary test data representing a relationship between air-fuel ratio, engine operation and hydrogen production, in accordance with the present disclosure.
Figure 8:
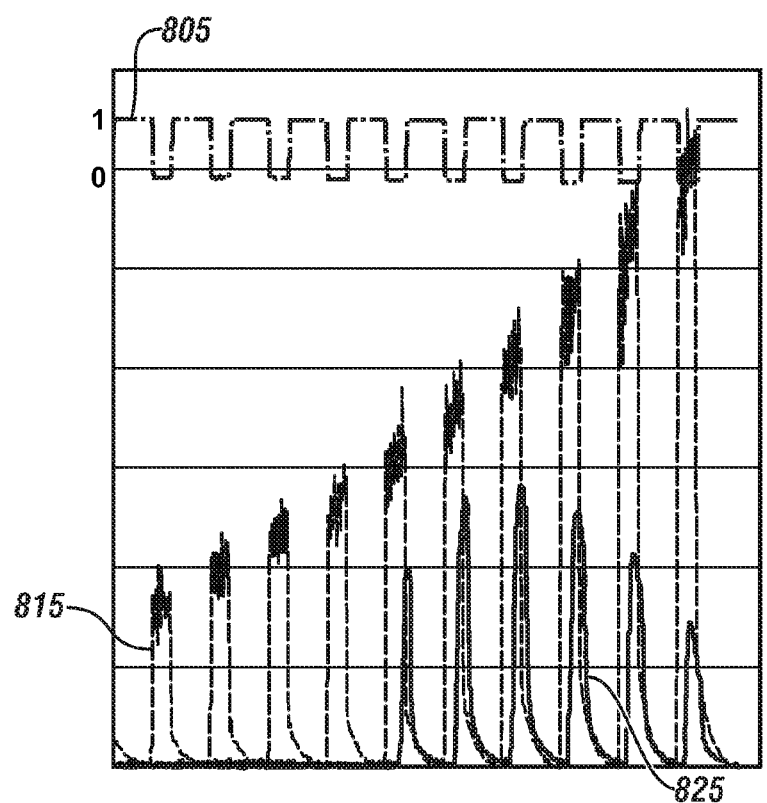

FIGS. 7 and 8 graphically depict exemplary test data representing a relationship between AFR, engine operation and hydrogen production in accordance with the present disclosure. The vertical axis in each of FIGS. 7 and 8 denotes a magnitude of hydrogen in ppm from 0 to 4,000 ppm in increments of 500 ppm. The horizontal axis in each of FIGS. 7 and 8 denotes a test time in seconds from 0 to 1,000. Specifically, FIG. 7 illustrates a control sequence 705 of a fuel pulse width, an engine-out hydrogen production profile 715 and a hydrogen presence profile 725 immediately downstream of a first discrete element, e.g., front brick of a TWC device. The control sequence 705 of the fuel pulse width corresponding to a value of "0" indicates the control sequence 705 is "on" and the engine is operating at one of a stoichiometric AFR and an AFR rich of stoichiometry. Accordingly, during the pulses when the control sequence 705 is "on," engine-out hydrogen is being produced as demonstrated by the hydrogen production profile 715. A value of "1" indicates the control sequence 705 is "off" and the engine is operating at an AFR lean of stoichiometry. Accordingly, during the pulses when the control sequence 705 is "off," engine-out hydrogen is not being produced as demonstrated by the hydrogen production profile 715. The hydrogen presence profile 725 indicates minimal presence of hydrogen immediately downstream of the first discrete element regardless of whether the control sequence 705 is "on" or "off." The minimal presence of hydrogen can be attributed to ammonia formation on the first discrete element facilitated in Equation [9].

FIG. 8 illustrates a control sequence 805 of a fuel pulse width, an engine-out hydrogen production profile 815 and a hydrogen presence profile 825 immediately downstream of a second discrete element, e.g., rear brick, of a TWC device. The control sequence 805 is analogous to the control sequence 705 illustrated in FIG. 7. The hydrogen presence profile 825 indicates an increased presence of hydrogen immediately downstream of the second discrete element as the AFR during control sequence 805 is decreased resulting in increased rich engine operation. The presence of hydrogen immediately downstream of the second discrete element can be attributed to the water-gas shift reaction facilitated in Equation [11] in the presence of oxygen storage capacity on the second discrete element. Thus, the water-gas shift reaction produces hydrogen as a by-product on the second discrete element.

Figure 9:
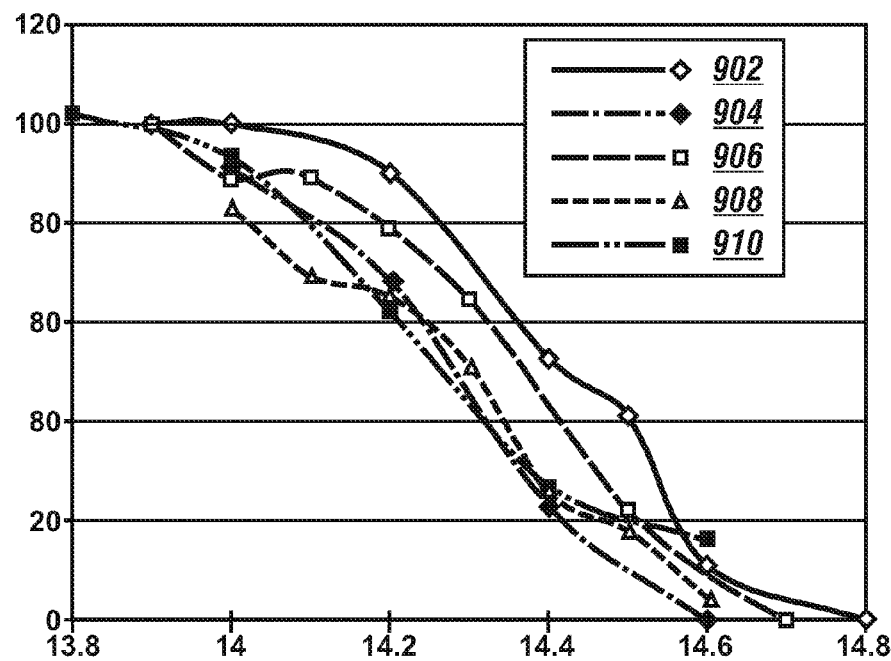
FIGS. 9 and 10 graphically depict exemplary test data representing a relationship between AFR of an engine-out exhaust gas feedstream during an ammonia generation cycle, in accordance with the present disclosure.
Figure 10:
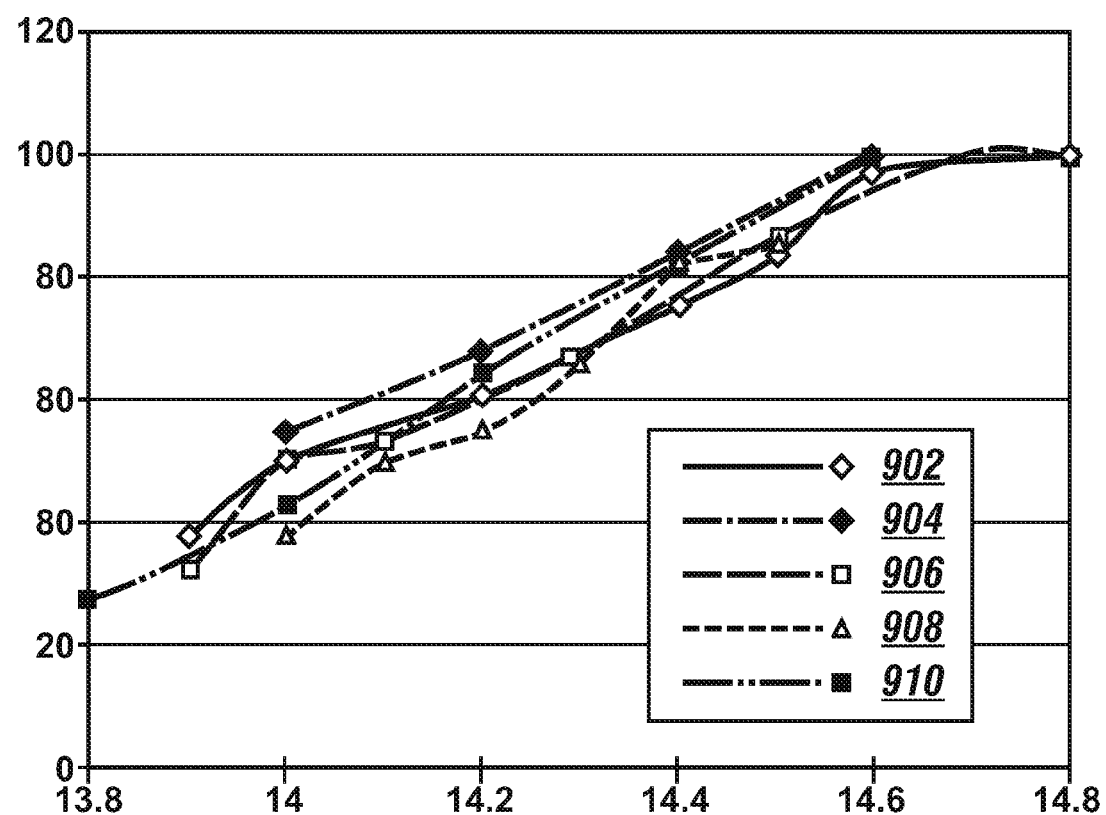

FIGS. 9 and 10 graphically depict exemplary test data representing a relationship between AFR of an engine-out exhaust gas feedstream during an ammonia generation cycle of a four-cylinder engine in accordance with the present disclosure. The horizontal axis in each of FIGS. 9 and 10 denotes AFR in an exhaust gas feedstream upstream of a TWC device, i.e., measured by a wide-range AFR sensor. A stoichiometric AFR is 14.6. The vertical axis in FIG. 9 denotes NOx to NH3 conversion efficiency on the TWC device. The vertical axis in FIG. 10 denotes CO conversion efficiency on the TWC device. Profile line 902 represents an AFR sweep where all four cylinders are operating at a fixed AFR. Profile line 904 represents AFR dithering having an amplitude of 0.01 and a frequency of 2.0 Hz where all four cylinders are dithered around a desired AFR. Profile line 906 represents lambda biasing wherein three cylinders are operated at a biased AFR that is rich of stoichiometry and one cylinder is operated at an un-biased AFR that is stoichiometric. Profile line 908 represents lambda biasing wherein two cylinders are operated at a biased AFR that is rich of stoichiometry and two of the cylinders are operated at an un-biased AFR that is stoichiometric. Profile line 910 denotes a combination of AFR dithering and lambda biasing wherein three of the cylinders are configured to dither around a biased AFR that is rich of stoichiometry and one cylinder is configured to dither around an un-biased AFR that is lean of stoichiometry. The three rich cylinders are dithered around the AFR that is rich of stoichiometry having an amplitude of 0.01 and a frequency of 2.0 Hz. The one lean cylinder is dithered around the AFR that is lean of stoichiometry having an amplitude of 0.01 and a frequency of 2.0 Hz resulting in an average AFR that is depicted along the horizontal axis.

Referring to FIG. 9, the AFR sweep (i.e., profile 902) has the best NOx to NH3 conversion efficiency from an AFR of 14.0 to an AFR of about 14.5. AFR dithering (i.e., profile line 904) has the worst NOx to NH3 conversion efficiency at a stoichiometric AFR of 14.6. Lambda biasing (i.e., profile line 906) wherein three cylinders are operated at a biased AFR that is rich of stoichiometry and one cylinder is operated at an un-biased AFR that is stoichiometric has the second best NOx to NH3 conversion efficiency from an AFR of about 14.1 to an AFR of about 14.5. Lambda biasing (i.e., profile line 908) wherein two cylinders are operated at a biased AFR that is rich of stoichiometry and two cylinders are operated at an un-biased AFR that is stoichiometric has the worst NOx to NH3 conversion efficiency at the AFR of about 14.0 and the fourth best NOx to NH3 conversion efficiency at the stoichiometric AFR of 14.6. The combination of AFR dithering and lambda biasing (i.e., profile line 910) has the best NOx to NH3 conversion efficiency at the stoichiometric AFR of 14.6.

Referring to FIG. 10, AFR dithering (i.e., profile line 904) has the best CO conversion efficiency on the TWC device from the AFR of about 14.0 to the stoichiometric AFR of 14.6. The combination of AFR dithering and lambda biasing (i.e., profile line 910) also has the best conversion efficiency at the stoichiometric AFR of 14.6. Lambda biasing (i.e. profile line 908) wherein two cylinders are operated at the biased AFR that is rich of stoichiometry and two of the cylinders are operated at the un-biased AFR that is stoichiometric has the second best CO conversion efficiency at the stoichiometric AFR of 14.6 and the worst CO conversion efficiency from an AFR at about 14.0 to an AFR at about 14.3. Lambda biasing (i.e., profile line 906) wherein three cylinders are operated at a biased AFR that is rich of stoichiometry and two of the cylinders are operated at the un-biased AFR that is stoichiometric has the worst CO conversion efficiency at the stoichiometric AFR of 14.6. The AFR sweep (i.e., profile line 902) has the fourth best CO conversion efficiency at the stoichiometric AFR of 14.6. Therefore, improved CO conversion efficiency during NH3 generation is depicted in profile lines 904, 908 and 910 compared to that of the AFR sweep represented in profile line 902.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A method for controlling ammonia generation in an exhaust gas feedstream output from an internal combustion engine equipped with an exhaust aftertreatment system including a first aftertreatment device, comprising:
   determining whether an ammonia generation cycle is necessary based on a monitored engine operation parameter, an exhaust gas feedstream parameter and an exhaust aftertreatment system parameter;
   executing the ammonia generation cycle to generate ammonia on the first aftertreatment device when the ammonia generation cycle is determined to be necessary, said ammonia generation cycle comprising:
      determining a desired air-fuel ratio of the engine to generate an engine-out exhaust gas feedstream conducive for generating ammonia on the first aftertreatment device; and
      selectively altering operation of a selected combination of a plurality of cylinders of the engine such that the desired air-fuel ratio of the engine is achieved, comprising intermittently operating the selected combination of the plurality of cylinders at:
         an air-fuel ratio that is at least stoichiometric to generate ammonia production on the first aftertreatment device; and
         an air-fuel ratio that is lean of stoichiometric to reduce carbon monoxide breakthrough caused by operation at the air-fuel ratio that is at least stoichiometric,
      wherein the average of the air-fuel ratio that is at least stoichiometric and the air-fuel ratio that is lean of stoichiometric is equal to the desired air-fuel ratio; and
   discontinuing the ammonia generation cycle when the ammonia generation cycle is determined to not be necessary based on the monitored engine operation parameter, the exhaust gas feedstream parameter and the exhaust aftertreatment system parameter.

2. The method of claim 1 wherein selectively altering operation of the selected combination of the plurality of cylinders of the engine such that the desired air-fuel ratio of the engine is achieved further comprises:
   operating each of the selected combination of the plurality of cylinders to dither around a median air-fuel ratio resulting in an average air-fuel ratio of the engine that is equal to the desired air-fuel ratio.

3. The method of claim 2 wherein operating each of the selected combination of the plurality of cylinders to dither around the median air-fuel ratio comprises:
   alternating operation of each of the selected combination of the plurality of cylinders between an air-fuel ratio having a peak amplitude above the median air-fuel ratio and an air-fuel ratio having a trough amplitude below the median air-fuel ratio.

4. The method of claim 3 wherein a magnitude of the peak amplitude above the median air-fuel ratio is equal to a magnitude of the trough amplitude below the median air-fuel ratio.

5. The method of claim 2 wherein the selected combination of the plurality of cylinders comprises all cylinders of the engine and the median air-fuel ratio comprises the desired air-fuel ratio.

6. The method of claim 1 wherein selectively altering operation of the selected combination of the plurality of cylinders of the engine such that the desired air-fuel ratio of the engine is achieved comprises:
   operating each of the selected combination of the plurality of cylinders at or around a biased air-fuel ratio; and
   operating each of any remaining unselected ones of the plurality of cylinders at or around an un-biased air-fuel ratio resulting in operation at an average air-fuel ratio of the selected combination of the plurality of cylinders and any remaining cylinders that is equal to the desired air-fuel ratio.

7. The method of claim 6 wherein operating each of the selected combination of the plurality of cylinders at the biased air-fuel ratio comprises:
   operating each of the selected combination of the plurality of cylinders at a rich of stoichiometry air-fuel ratio.

8. The method of claim 6 wherein operating each of the remaining cylinders at the un-biased air-fuel ratio comprises:
   operating each of the remaining cylinders at one of a stoichiometric air-fuel ratio and a lean of stoichiometry air-fuel ratio.

9. The method of claim 6 wherein the selected combination of the plurality of cylinders comprises a majority of the plurality of cylinders.

10. The method of claim 6 further comprising:
    operating each of the selected combination of the plurality of cylinders to dither around the biased air-fuel ratio.

11. The method of claim 6 further comprising:
    operating each of the remaining cylinders to dither around the un-biased air-fuel ratio.

12. The method of claim 1 wherein the desired air-fuel ratio of the engine comprises one of a stoichiometric air-fuel ratio and a rich of stoichiometric air-fuel ratio to generate the engine-out exhaust gas feedstream including nitric oxide, carbon monoxide, hydrogen and unburned hydrocarbons that converts to ammonia on the first aftertreatment device.

13. The method of claim 1 wherein the first aftertreatment device comprises a three-way catalytic device that is fluidly serially connected upstream of an ammonia-selective catalytic reduction device.

14. A method for controlling ammonia generation in an exhaust gas feedstream output from an internal combustion engine equipped with an exhaust aftertreatment system including a three-way catalytic device and an ammonia-selective catalytic reduction device, comprising:
    determining whether an ammonia generation cycle is necessary based on a monitored engine operation parameter, an exhaust gas feedstream parameter and an exhaust aftertreatment system parameter;
    executing the ammonia generation cycle to generate ammonia on the three-way catalytic device when the ammonia generation cycle is determined to be necessary, said ammonia generation cycle comprising:
       determining a desired air-fuel ratio of the engine to generate an engine-out exhaust gas feedstream including nitric oxide, carbon monoxide, hydrogen and unburned hydrocarbons that enters the exhaust aftertreatment system and converts to ammonia on the three-way catalytic device;
       selectively altering operation of a selected combination of a plurality of cylinders of the engine such that the desired air-fuel ratio of the engine is achieved, comprising intermittently operating the selected combination of the plurality of cylinders at:
          an air-fuel ratio that is at least stoichiometric to generate ammonia production on the first aftertreatment device; and an air-fuel ratio that is lean of stoichiometric to reduce carbon monoxide breakthrough caused by operation at the air-fuel ratio that is at least stoichiometric, wherein the average of the air-fuel ratio that is at least stoichiometric and the air-fuel ratio that is lean of stoichiometric is equal to the desired air-fuel ratio;

wherein selectively altering operation of the selected combination of the plurality of cylinders of the engine comprises one of:

operating all cylinders of the engine to dither around the desired air-fuel ratio; and operating each of a selected combination of a plurality of cylinders of the engine at a biased air-fuel ratio and each of the remaining cylinders at an un-biased air-fuel ratio resulting in operation at an average air-fuel ratio of the selected combination of the plurality of cylinders and the remaining cylinders that is equal to the desired air-fuel ratio; and discontinuing the ammonia generation cycle when the ammonia generation cycle is determined to not be necessary based on the monitored engine operation parameter, the exhaust gas feedstream parameter and the exhaust aftertreatment system parameter.

15. The method of claim 14 wherein operating each of the selected combination of the plurality of cylinders of the engine comprises:

operating each of the selected combination of the plurality of cylinders to dither around the biased air-fuel ratio.

16. The method of claim 14 wherein operating each of the selected combination of the plurality of cylinders of the engine comprises:

operating each of the selected combination of the plurality of cylinders of the engine at a rich of stoichiometry air-fuel ratio.

17. The method of claim 14 wherein the three-way catalytic device comprises a first discrete element including catalytic material comprising palladium and a second discrete element including catalytic material comprising palladium and rhodium and oxygen storage capacity material comprising at least one of cerium and zirconium, the first and second discrete elements positioned in series along a flow axis of the exhaust gas feedstream.

18. The method of claim 14 wherein executing the ammonia generation cycle to generate ammonia on the three-way catalytic device is executed when an ammonia generation condition is met.

19. The method of claim 14 further comprising:

terminating the ammonia generation cycle when an ammonia termination condition is met; and in response to terminating the ammonia generation cycle, transitioning engine operation to operate at non-ammonia generating conditions.

20. An exhaust aftertreatment system for an internal combustion engine, comprising:

a catalytic device formulated to produce ammonia from an exhaust gas feedstream that includes nitric oxide, carbon monoxide, hydrogen and unburned hydrocarbons, the catalytic device close-coupled to an exhaust manifold of the internal combustion engine and fluidly coupled to an ammonia-selective catalytic reduction device located downstream of the catalytic device;

a control module:

determining whether an ammonia generation cycle is necessary based on a monitored engine operation parameter, an exhaust gas feedstream parameter and an exhaust aftertreatment system parameter;

executing the ammonia generation cycle to generate ammonia on the catalytic device when the ammonia generation cycle is determined to be necessary;

determining a desired air-fuel ratio of the engine to generate an engine-out exhaust gas feedstream conducive for generating ammonia on the catalytic device; and altering operation of a selected combination of a plurality of cylinders of the engine such that the desired air-fuel ratio of the engine is achieved, comprising intermittently operating the selected combination of the plurality of cylinders at:

an air-fuel ratio that is at least stoichiometric to generate ammonia production on the catalytic device; and an air-fuel ratio that is lean of stoichiometric to reduce carbon monoxide breakthrough caused by operation at the air-fuel ratio that is at least stoichiometric, wherein the average of the air-fuel ratio that is at least stoichiometric and the air-fuel ratio that is lean of stoichiometric is equal to the desired air-fuel ratio; and discontinuing the ammonia generation cycle when the ammonia generation cycle is determined to not be necessary based on the monitored engine operation parameter, the exhaust gas feedstream parameter and the exhaust aftertreatment system parameter.

* * * * *